United States Patent
Xie et al.

(10) Patent No.: US 11,640,283 B2
(45) Date of Patent: May 2, 2023

(54) CONTROL BAR FOR ELEMENT ACTIVATION

(71) Applicant: eBay Inc., San Jose, CA (US)

(72) Inventors: Feng Xie, Shanghai (CN); Pei Wang, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 17/504,835

(22) Filed: Oct. 19, 2021

(65) Prior Publication Data

US 2022/0058003 A1 Feb. 24, 2022

Related U.S. Application Data

(63) Continuation of application No. 16/998,465, filed on Aug. 20, 2020, now Pat. No. 11,182,136.

(51) Int. Cl.
*G06F 8/38* (2018.01)
*G06F 3/0482* (2013.01)
*G06F 8/34* (2018.01)

(52) U.S. Cl.
CPC .............. *G06F 8/38* (2013.01); *G06F 3/0482* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 5,305,435 A | 4/1994 | Bronson et al. | |
| 5,396,590 A | 3/1995 | Kreegar et al. | |
| 5,515,496 A | 5/1996 | Kaehler et al. | |
| 5,588,098 A | 12/1996 | Chen et al. | |
| 5,861,889 A | 1/1999 | Wallace et al. | |
| 6,002,400 A | 12/1999 | Loring et al. | |
| 6,781,597 B1 | 8/2004 | Vrobel et al. | |
| 7,302,650 B1 | 11/2007 | Allyn et al. | |
| 8,438,495 B1 | 5/2013 | Gilra et al. | |
| 10,318,034 B1 | 6/2019 | Hauenstein et al. | |
| 11,182,136 B1 | 11/2021 | Xie et al. | |
| 2001/0055031 A1 | 12/2001 | Andersson | |

(Continued)

OTHER PUBLICATIONS

Final Office Action received for U.S. Appl. No. 16/998,465, dated Jun. 23, 2021, 25 pages.

(Continued)

*Primary Examiner* — Ryan Barrett
(74) *Attorney, Agent, or Firm* — FIG. 1 Patents

(57) ABSTRACT

A control bar for element activation is described. A design interface for editing digital content includes at least a first control bar and a second control bar. The first control bar is associated with a first element of the digital content and the second control bar is associated with a second element of the digital content that at least partially overlaps the first element in the digital content. The control bars are configured to remain visible and selectable in the design interface while editing the digital content. User input to select the first control bar or the second control bar is received, and the respective first element or second element associated with the selected control bar is activated responsive to the user input. The activating changes a visual appearance of both the selected control bar and the activated element and enables user interaction with the activated element.

20 Claims, 11 Drawing Sheets

(56) References Cited

U.S. PATENT DOCUMENTS

| | | |
|---|---|---|
| 2005/0091672 A1 | 4/2005 | Debique et al. |
| 2007/0126732 A1 | 6/2007 | Robertson et al. |
| 2009/0217206 A1 | 8/2009 | Liu et al. |
| 2009/0265656 A1 | 10/2009 | Jetha et al. |
| 2011/0078597 A1 | 3/2011 | Rapp et al. |
| 2011/0246949 A1 | 10/2011 | Baszucki |
| 2012/0030569 A1 | 2/2012 | Migos et al. |
| 2012/0293558 A1 | 11/2012 | Dilts et al. |
| 2014/0137019 A1 | 5/2014 | Paulsen et al. |
| 2014/0146039 A1 | 5/2014 | Duplessis et al. |
| 2014/0149944 A1 | 5/2014 | Duplessis et al. |
| 2014/0365958 A1 | 12/2014 | Park et al. |
| 2016/0071241 A1 | 3/2016 | Karunamuni et al. |
| 2017/0116967 A1 | 4/2017 | Bauermeister et al. |
| 2017/0285913 A1 | 10/2017 | Young et al. |
| 2017/0357320 A1 | 12/2017 | Chaudhri et al. |
| 2021/0352348 A1* | 11/2021 | Reid ........................ G06F 1/163 |

OTHER PUBLICATIONS

Non Final Office Action Received for U.S. Appl. No. 16/998,465, dated Jul. 28, 2021, 26 pages.

Non-Final Office Action received for U.S. Appl. No. 16/998,465, dated Apr. 1, 2021, 24 Pages.

Notice of Allowance received for U.S. Appl. No. 16/998,465, dated Oct. 1, 2021, 19 Pages.

Hands-On Webflow, 4 pages.

Babich,"Webflow: The Web Development Platform of the Future", Smashing Magazine, Retrieved from the Internet URL https://www.smashingmagazine.com/2019/09/webflow-the-future-of-web-development/#comments-webflow-the-future-of-web-development, Sep. 10, 2019, 22 pages.

"Extended European Search Report", European Patent Application No. 21188104.0, dated Jan. 17, 2022, 9 pages.

* cited by examiner

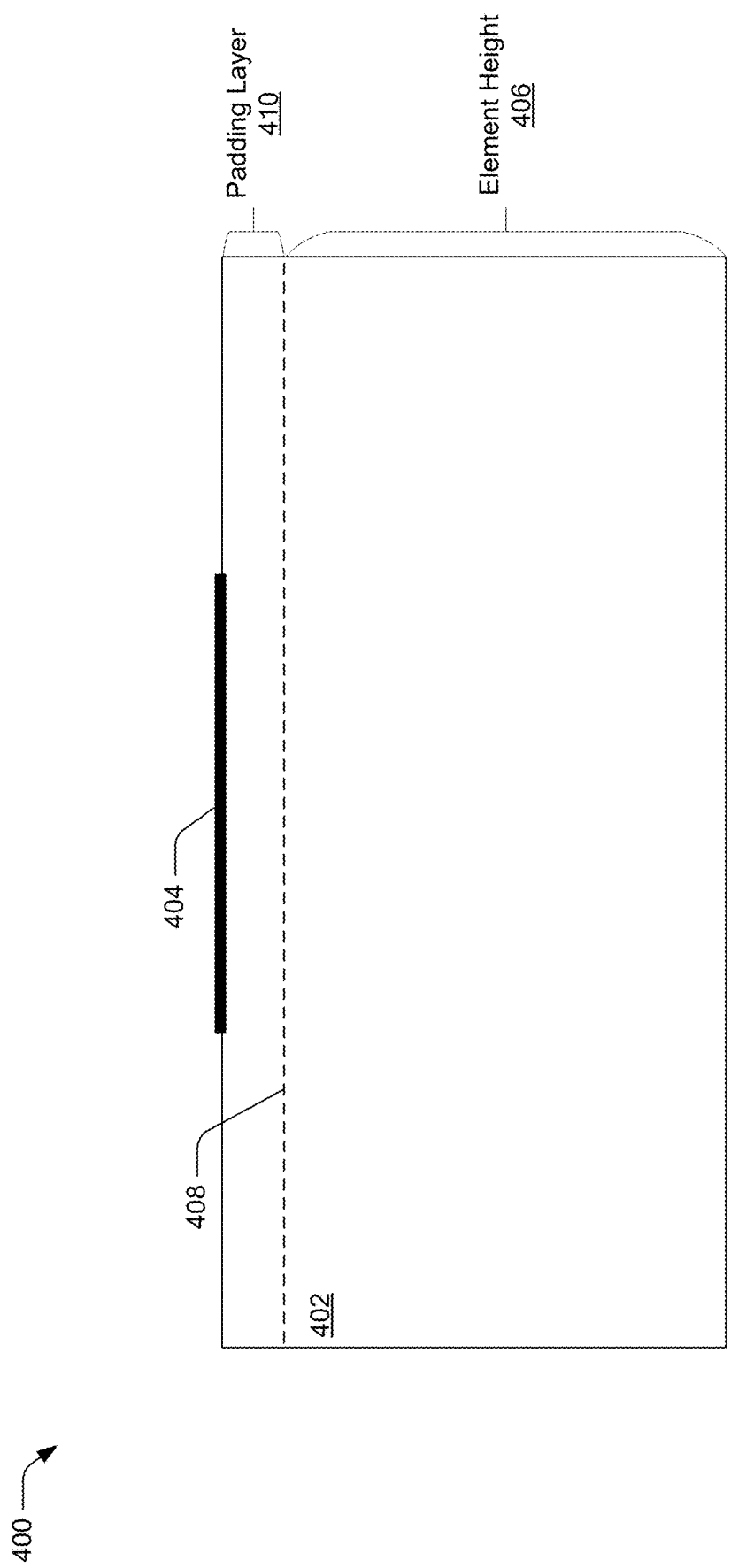

600

CONTROL BAR FOR ELEMENT ACTIVATION

RELATED APPLICATIONS

This application is a continuation of and claims priority to U.S. patent application Ser. No. 16/998,465, filed Aug. 20, 2020, entitled "Control Bar for Element Activation", the entire disclosure of which is hereby incorporated by reference herein in its entirety.

BACKGROUND

Digital content can be created using a conventional content editing application to have multiple overlapping elements, such as tabs, forms, tables, shapes, images, and text boxes. Conventional content editing applications, however, are unable to visually differentiate these overlapping elements, such as when a first element completely occludes a second element of the digital content, or when a first element is positioned within a boundary of a second element. This failure to visually differentiate overlapping elements of digital content makes it difficult for the user to identify and select individual elements in order to perform an operation with respect to the element, such as by moving, resizing, changing the color, changing the line width, and so forth. For example, in order to select overlapping elements using such conventional content editing applications, the user must either access a separate menu or repeatedly click or tap on the digital content in an attempt to select the desired element. This is not intuitive for most users and makes it difficult to identify and interact with overlapping elements during content creation.

SUMMARY

To overcome these problems, a control bar for element activation is leveraged. A design interface for editing digital content includes at least a first control bar and a second control bar. The first control bar associated is with a first element of the digital content and the second control bar is associated with a second element of the digital content that at least partially overlaps the first element in the digital content. The first control bar and the second control bar are configured to remain visible and selectable in the design interface while editing the digital content. User input to select the first control bar or the second control bar is received, and the respective first element or second element associated with the selected control bar is activated responsive to the user input. The activating changes a visual appearance of both the selected control bar and the activated element and enables user interaction with the activated element. A finalized version of the digital content is then generated by removing the first control bar and the second control bar from the finalized version of the digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

FIG. 4 depicts an example of an element and associated control bar that is positioned at a preconfigured distance above a top boundary of the element.

DETAILED DESCRIPTION

Overview

Figure 1:
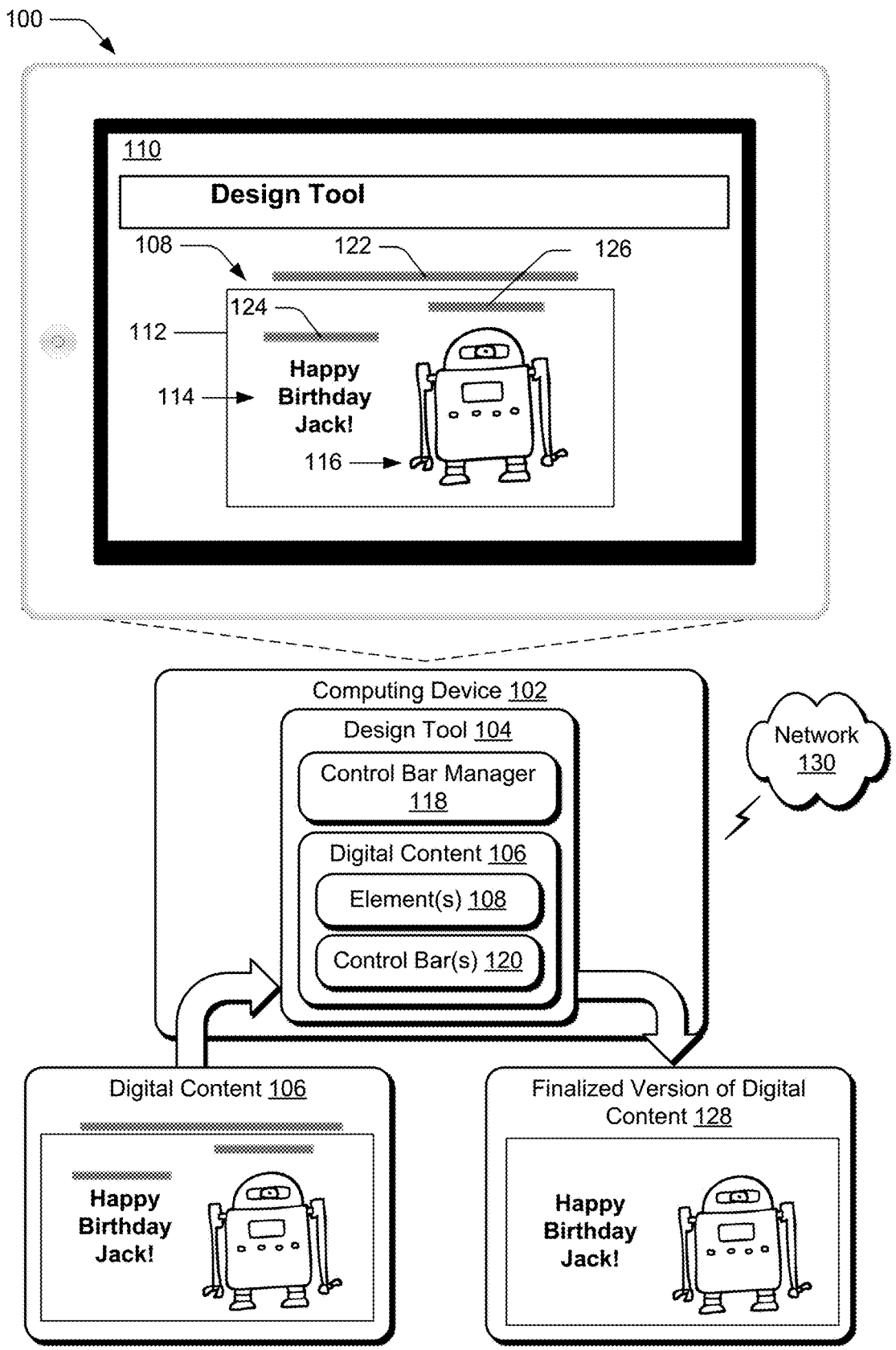
FIG. 1 is an illustration of an environment in an example implementation that is operable to employ techniques described herein.

A control bar for element activation is described. The techniques described herein solve the problems associated with conventional content editing applications by providing an "always visible" and "always selectable" control bar that is associated with individual elements of digital content. Each respective control bar is configured to remain "visible" and "selectable" at all times while editing the digital content, even when an element overlaps with another element of the digital content. For example, the control bar associated with an element will remain visible even if the element is occluded by another element causing the element to be "hidden", or if the element is positioned within the boundary of another element. Moreover, a position of the control bar relative to the element remains fixed at all times, even if the element is moved or resized. In an example implementation, the control bar is provided as a horizontal bar and is positioned at a preconfigured distance above the top boundary of the element. In this way, the position of the element can be readily identified based on the position of the visible control bar.

The control bar may be selected in order to activate the respective element associated with the selected control bar such that the user can interact with the activated element. In other words, rather than selecting the element itself, the user can instead select the associated control bar in order to activate the element. Due to the control bar being always visible and selectable, the user can select the control bar with a single click or tap on the control bar regardless of the positioning of the control bar relative to other elements of the digital content. In other words, the control bar remains in a top layer of the digital content at all times during the editing phase such that any input to the digital content at a position associated with the control bar causes the associated element to be activated, even in cases in which multiple elements overlap. For example, even if an element is completely blocked from view by an additional element, the control bar associated with this hidden element will remain visible and selectable in the design interface. As another example, when a first element is positioned within a boundary of a second element, the first element can be readily selected with a single click on the associated control bar even through said control bar is within the boundary of the first element.

Responsive to detecting user input to a control bar, the associated element is activated. Once activated, subsequent user input is interpreted as input to perform an operation with respect to the activated element, such as to configure properties of the element. In this way, the user can provide a first input by clicking or tapping a control bar to activate the associated element, and then provide a second input to interact with or edit the activated element, such as by dragging the activated element to a new position within the digital content, changing a size, shape, or color of the activated element, or modifying other parameters or attributes of the activated element. In one or more implementations, selection of the control bar also causes a change in the visual appearance of both the control bar and the associated element in order to visually indicate that the element is activated, such as by visually identifying a boundary of the activated element, modifying a color of the selected control bar and/or the activated element, or changing a size of the selected control bar.

At the conclusion of the design and editing phase, a finalized version of the digital content is generated. The finalized version of the digital content, for example, can correspond to a graphic, video, document, web page, and so forth. As part of generating the finalized version of the digital content, the control bars are automatically removed from the digital content such that they are no longer visible in the finalized version of the digital content.

Thus, the control bar described herein solves the problems of conventional content editing applications by enabling elements to always be selectable during the design phase even when such elements are hidden or positioned within the boundary of other elements. Doing so enables the user to easily identify hidden elements and configure the properties of such hidden elements no matter how many elements are added to the digital content because the control bar is always displayed and selectable. Moreover, the control bars are removed at the conclusion of the editing phase and thus do not impact the finalized version of the digital content.

In the following discussion, an example environment is first described that may employ the techniques described herein. Example implementation details and procedures are then described which may be performed in the example environment as well as other environments. Performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102, which may be configured in a variety of ways. The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 6.

The computing device 102 is illustrated as including a design tool 104. Generally, the design tool 104 represents an application or functionality of the computing device 102 to design, create, and/or modify digital content 106. As described herein, digital content 106 may include any type of digital content that is designed, created, or edited using design tool 104, including by way of example and not limitation, graphics, digital presentations, documents, videos, images, web pages, and so forth. For example, the design tool 104 may be implemented as a graphics editing application, a word processing application, a web page design application, and so forth. The design tool 104 may further be representative of more than one application (e.g., a suite of applications) that supports functionality to perform content editing operations on various types of digital content 106 without departing from the spirit or scope of the techniques described herein. At least some of the digital content 106, relative to which the design tool 104 is configured to perform operations may be maintained in storage of the computing device 102. However, the digital content 106 may also represent digital content accessible to the computing device 102 in other ways, e.g., accessible to the computing device 102 from storage of another device over network 130. The digital content 106 may represent various types of digital content without departing from the spirit or scope of the techniques described herein.

The design tool 104 includes functionality that enables users to create and arrange a variety of digital content elements 108 ("elements 108") within the digital content 106. As described herein, elements 108 can include any element or object that is included with digital content 106, including by way of example and not limitation, images, text, points, lines, basic shapes (e.g., rectangles, squares, ellipses, circles, triangles, and so on), user-defined shapes (e.g., by drawing and connecting a series of lines), and so forth.

In accordance with the techniques described herein, elements 108 may also include container elements which correspond to an element that can contain other elements 108 within a boundary of the container element. In some cases, the design tool 104 establishes a hierarchical relationship between the container element and the elements contained within the container element. For example, the container element may be established as the parent element for one or more child elements contained within the parent element. Examples of container elements 108 include, by way of example and not limitation, frames, tabs, tables, forms, and lists. In some cases, a hierarchical relationship between elements 108 may be established based on the positioning of elements within the digital content. For example, a parent-child relationship may be established when a user positions a first shape within the boundary of a second shape.

In order to facilitate the design, creation, or editing of digital content 106, the design tool 104 includes functionality for editing digital content 106 during a design phase. As part of the design phase, the design tool 104 provides a design interface 110 that allows users to interact with and edit the elements 108 of the digital content in order to change the properties or attributes of these elements, such as the element's position within the digital content 106, size, shape, color, transparency, fill type (e.g., solid, gradient, pattern, texture, and so on), depth relative to other objects (e.g., in front of or behind), whether the elements cast shadows, and so forth. The design tool 104 may facilitate other content editing operations via the functionality of the design interface 110 without departing from the spirit or scope of the techniques described herein.

By way of example, the digital content 106 is depicted as being displayed within the design interface 110 as a graphic that the user is creating and editing using the design tool 104. The graphic, in this instance, is a birthday card graphic and includes a container element 112, a text element 114 (which includes the words "Happy Birthday Jack!"), and an image element 116 (an image of a robot). Notably, the elements 114 and 116 are positioned within a boundary of the container element 112, which may cause the design tool 104 to create a hierarchical relationship between "parent" element 112 and "child" elements 114 and 116. Moreover, it is to be appreciated that elements 114 and 116 each partially overlap element 112 due to their positioning with the boundary of element 112. Using conventional content editing applications, it can be difficult for the user to select and interact with or edit these overlapping elements. For example, clicking on element 114 or 116 using a conventional content editing application may cause the application to interpret the click as a selection of the container element 112. This can lead to user frustration and confusion as the user tries to select a desired element.

To solve these problems, the computing device 102 is depicted as including a control bar manager 118, the functionality of which may be incorporated in and/or accessible to the design tool 104. The control bar manager 118 is implemented at least partially in hardware of the computing device 102 to facilitate efficient and effective creation and editing of digital content 106 through the use of control bars 120 associated with the elements 108 of the digital content 106. Continuing with the example above, the control bar manager 118 displays control bars 122, 124, and 126 for elements 112, 114, and 116, respectively. Each of control bars 122, 124, and 126 are selectable by the user in order to activate the corresponding element 112, 114, or 116. The activating enables user interaction with the activated element, such as to move the activated element, change a size, color or shape of the activated element, or modify other properties or attributes of the activated element. Notably, the control bar manager 118 controls the control bars 120 to remain visible and selectable in the design interface 110 while editing the digital content 106 during the design phase.

At the completion of the design phase, the design tool 104 generates a finalized version of the digital content 128. The finalized version of the digital content 128, for example, can correspond to an image file, movie, document, web page, and so forth. As part of generating the finalized version of the digital content 128, the control bar manager 118 automatically removes the control bars 120 from the digital content 106 such that they are no longer visible in the finalized version of the digital content 128. For example, as depicted in environment 100, the design tool 104 has removed the control bars 122, 124, and 126 from the finalized version of the digital content 128.

Having considered an example environment, consider now a discussion of some example details of the techniques for a control bar for element activation in accordance with one or more implementations.

Figure 2:
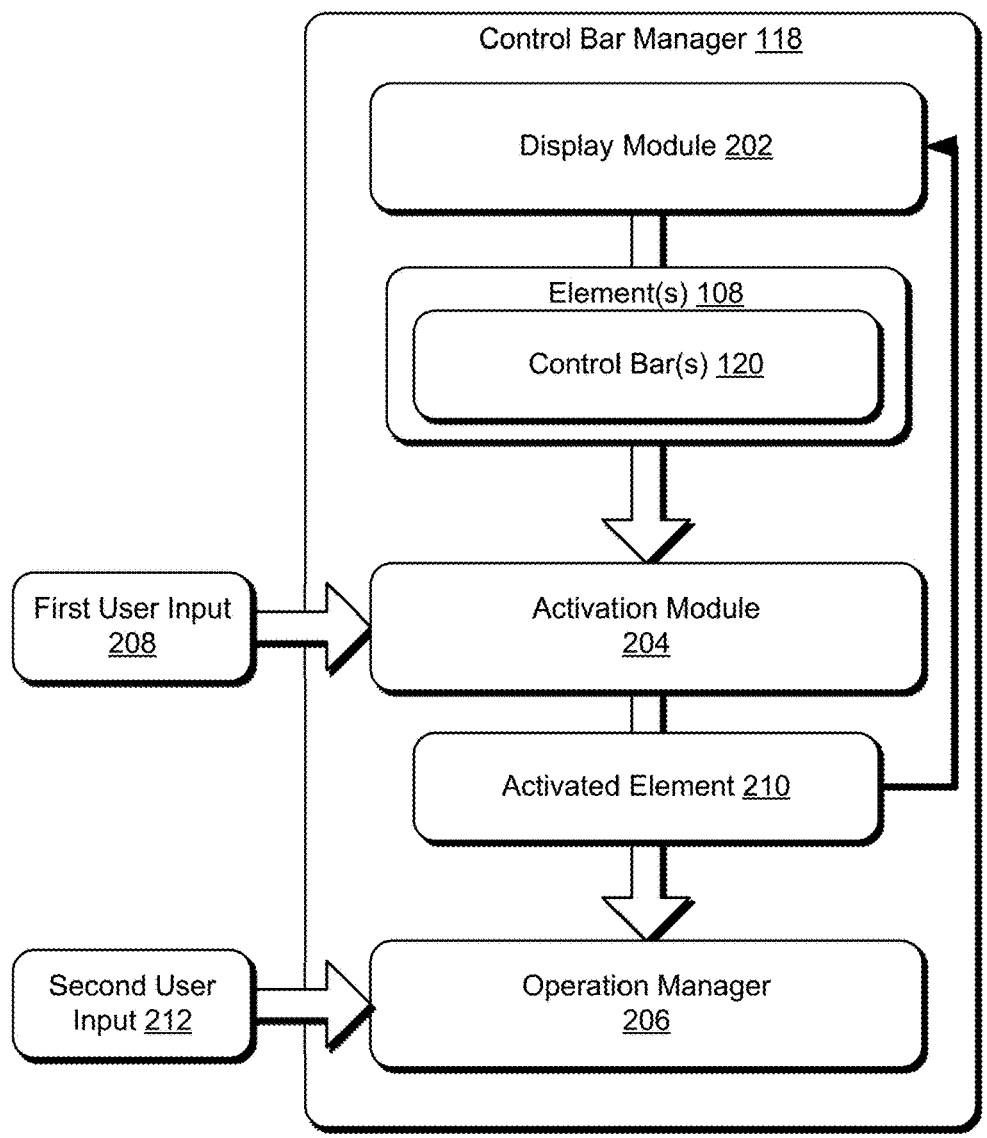
FIG. 2 depicts an example system in which the control bar manager of FIG. 1 controls a control bar for element activation in accordance with the described techniques.

FIG. 2 depicts an example system 200 in which the control bar manager 118 of FIG. 1 controls a control bar for element activation in accordance with the described techniques. In the illustrated example 200, the control bar manager 118 includes a display module 202, an activation module 204, and an operation manager 206. Although depicted with these three modules, in implementation the control bar manager 118 may include more, fewer, or different modules to control the control bar for element activation without departing from the spirit or scope of the techniques described herein.

In the illustrated example 200, the display module 202 is depicted as controlling the display of control bars 120 and associated elements 108. As part of this, the display module 202 of the control bar manager 118 controls the display of a control bar 120 at a position that remains fixed relative to the respective position of the associated element 108. In this way, the position of the element can be readily identified by the user based on the position of the visible control bar 120. In one or more implementations, the display module 202 provides a horizontal control bar that is displayed at a preconfigured distance above a top boundary of the associated element. However, the display module 202 can provide a variety of different shapes for the control bar as well as display the control bar at different positions relative to the associated elements without departing form the spirit or scope of the described techniques, such as by positioning the control bar to the right, left, or below the associated element in the digital content. As described throughout, the display module 202 controls the control bars 120 to remain visible and selectable in the design interface while editing the digital content.

The activation module 204 is depicted as monitoring for and receiving a first user input 208 to select one of the displayed control bars 120. Due to the control bar being always visible and selectable, the first user input 208 can be received as a single click or tap on the control bar 120 regardless of the positioning of the control bar relative to other elements of the digital content. In other words, the control bar remains in a top layer of the digital content at all times during the editing phase such that any input to the digital content at a position associated with the control bar causes the activation module 204 to interpret the input as a user selection of the control bar, even in cases in which multiple elements overlap. Responsive to detecting the first user input 208 to select a control bar 120, the activation module 204 activates the element associated with the selected control bar, which is depicted as activated element 210 in example 200.

The activation module 204 is depicted as communicating an indication of the activated element 210 back to the display module 202. Responsively, the display module 202 changes a visual appearance of both the selected control bar and the activated element 210. The display module can change the visual appearance of the selected control bar and the activated element 210 in a variety of different ways, including by way of example and not limitation, visually identifying a boundary of the activated element 210, modifying a color of the selected control bar and/or the activated element 210, or changing a size of the selected control bar.

The activation module 204 also communicates an indication of the activated element 210 to the operation manager 206 to inform the operation manager 206 that the activated element 210 is currently active. Subsequently, the operation manager 206 receives a second user input 212 and interprets the second user input 212 as input to perform an operation with respect to the activated element 210. In this way, the user can quickly click or tap a control bar to activate the associated element, and then provide a second input to interact with or edit the activated element 210, such as by dragging the activated element to a new position within the digital content, changing a size, shape, or color of the activated element 210, or modifying other parameters or attributes of the activated element 210.

Figure 3A:
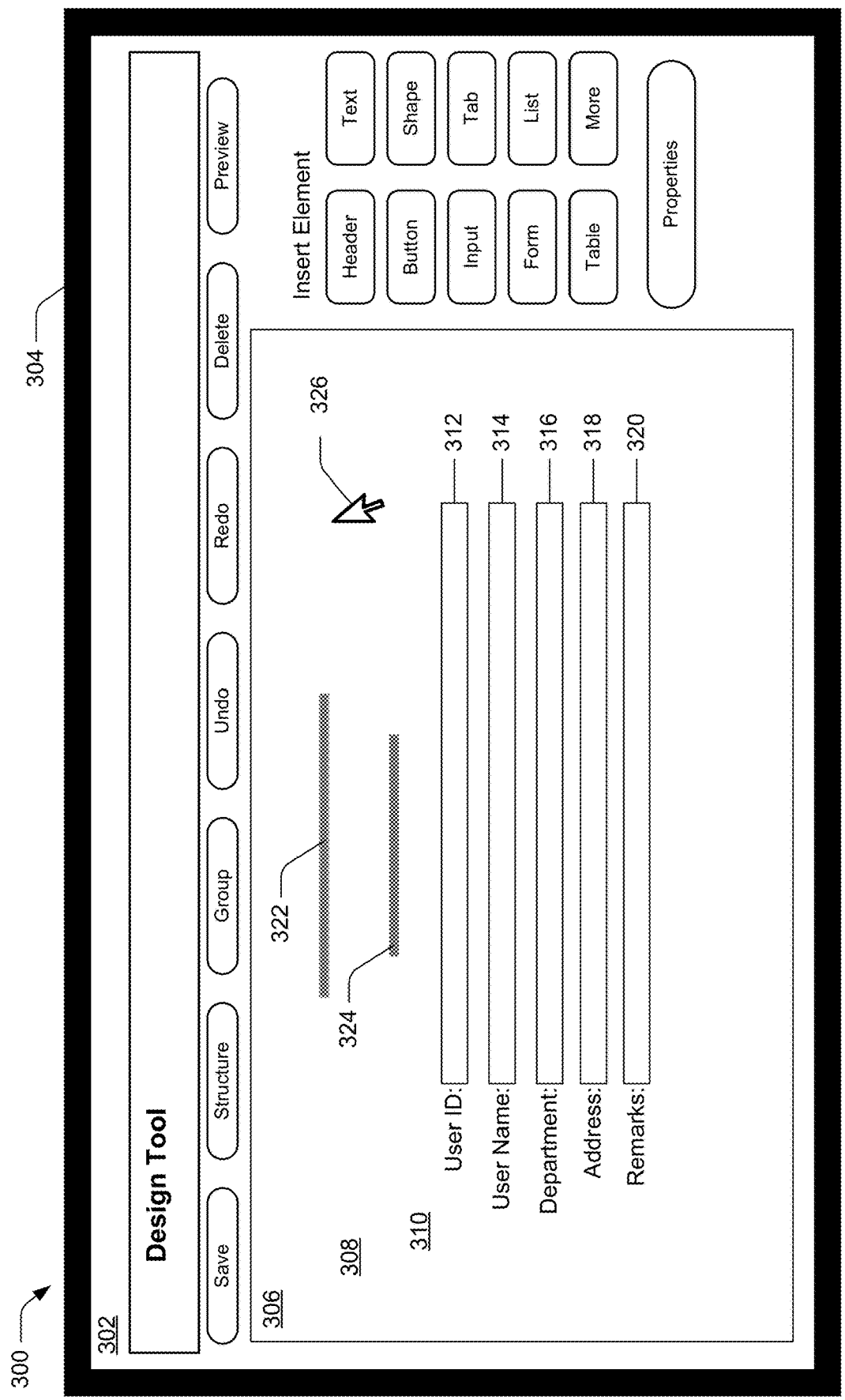
FIGS. 3A-3F depict an example of a design interface of a design tool used in connection with a control bar manager.

FIGS. 3A-3F depict an example 300 of a design interface of a design tool used in connection with a control bar manager. The illustrated example 300 includes a design interface 302 displayed via display device 304. In FIG. 3A, the design interface 302 is depicted as including a design area 306 for designing and editing digital content. The design area 306, in this example, is shown as displaying various elements for a web page, including a frame element 308 that contains a form element 310. The form element 310, in this example, includes multiple data entry field elements 312, 314, 316, 318, and 320, which are configured to receive user input corresponding to a user ID, user name, department, address, and remarks, respectively. The design interface 302 in this example is further depicted as including various controls to insert elements into the digital content, modify parameters of the digital content, and perform various other operations associated with the digital content.

Notably, form element 310 is positioned within a boundary of frame element 308 which may cause the design tool 104 to create a hierarchical relationship between these elements such that frame element 308 is the "parent" and form element 310 is the "child". Similarly, the multiple data entry field elements 312, 314, 316, 318, and 320 are positioned within a boundary of form element 310 which may cause the design tool 104 to create a hierarchical relationship between these elements such that the form element 310 is the "parent" and the data entry field elements 312, 314, 316, 318, and 320 are the "children" of form element 310. Moreover, it is to be appreciated that elements 308, 310, 312, 314, 316, 318, and 320 overlap each other due to the positioning of form element 310 within the boundary of frame element 308, and the positioning of elements 312, 314, 316, 318, and 320 within form element 310. Using conventional content editing applications, it can be difficult for the user to select and interact with or edit these overlapping elements.

To solve the problems associated with conventional content editing applications, the control bar manager 118 displays a control bar 322 associated with frame element 308 and a control bar 324 associated with form element 310. Each of control bars 322 and 324 are selectable by the user in order to activate the corresponding element 308 or 310, respectively. The activating enables user interaction with the activated element, such as to move the activated element, change a size, color or shape of the activated element, or modify other properties or attributes of the activated element. As discussed throughout, the control bar manager 118 controls the control bars 322 and 324 to remain visible and selectable in the design interface 110 while editing the digital content 106 during the design phase.

The illustrated example 300 also includes a cursor 326, which represents functionality to enable a user to provide input to select elements or controls displayed in the design interface 302. Although the cursor 326 is illustrated, in one or more implementations there may be no displayed cursor. Additionally or alternately, the element and controls of the design interface 302 may be selected in other ways, such as via touch input (or other gesture input), keyboard input, stylus input, voice input, and so forth.

Figure 3B:
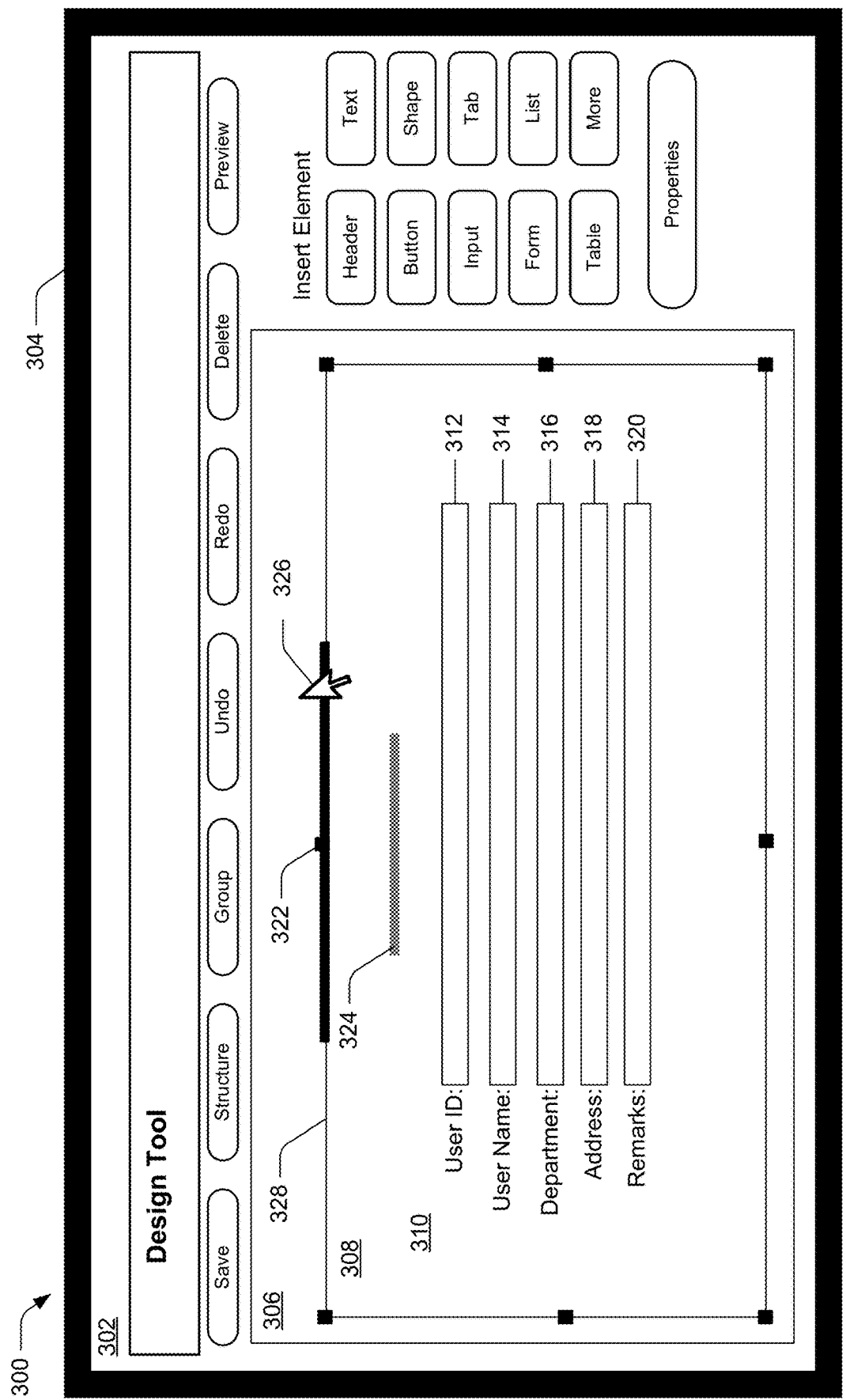

In FIG. 3B, the cursor 326 is depicted selecting the control bar 322 associated with the frame element 308. The control bar 322 can be selected, for example, by positioning cursor 326 over the control bar 322 and initiating a single click or tap. Responsive to the selection of control bar 322, the control bar manager 118 activates the associated frame element 308. The activating enables user interaction with frame element 308, such as to move or resize the frame element, or modify other properties or attributes of the frame element via user selection of various controls in the design interface 302.

As part of activating frame element 308, the control bar manager 118 also changes a visual appearance of both the selected control bar 322 and the activated frame element 308. In this example, control bar manager 118 is depicted as changing the color and width of the selected control bar 322. For example, as compared to FIG. 3A, the control bar 322 has increased in width and changed color from gray to black. Doing so visually distinguishes the selected control bar 322 from control bar 324 which is not currently active. Additionally, the control bar manager 118 has visually identified a border 328 of the activated frame element 308. In some cases, the control bar manager may also highlight the activated frame element 308 to show that the frame element 308 is currently active. It is to be appreciated that the control bar manager may change the visual appearance of the selected control bar and the activated element in a variety of different ways without departing from the spirit or scope of the described techniques.

Figure 3C:
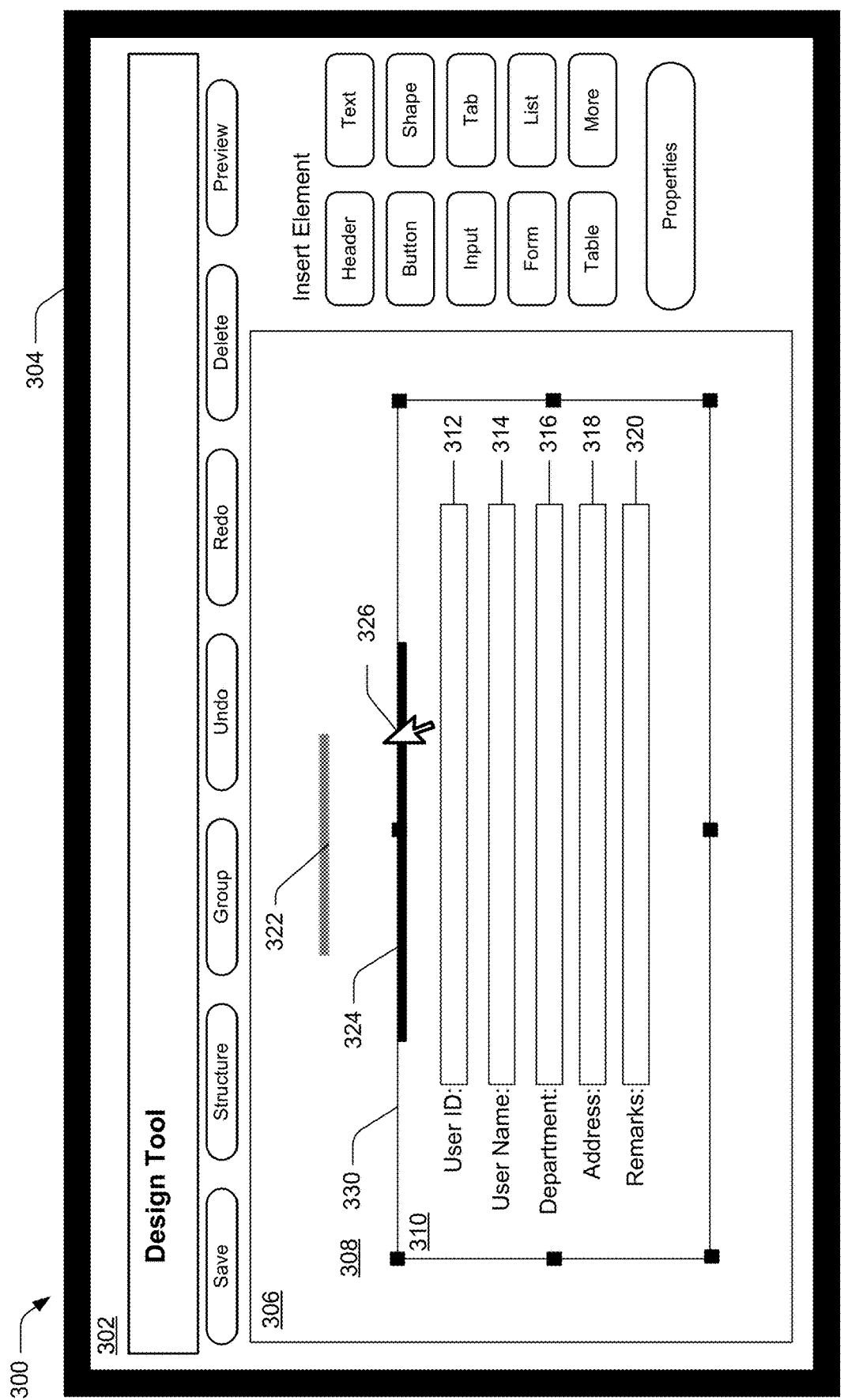

In FIG. 3C, the cursor 326 is depicted selecting the control bar 324 associated with the form element 310. The control bar 324 can be selected, for example, by positioning cursor 326 over the control bar 324 and initiating a single click or tap. Responsive to the selection of control bar 324, the control bar manager 118 activates the associated form element 310. The activating enables user interaction with form element 310, such as to move or resize the form element, or modify other properties or attributes of the form element via user selection of various controls in the design interface 302.

As part of activating form element 310, the control bar manager 118 also changes a visual appearance of both the selected control bar 324 and the activated form element 310. In this example, control bar manager 118 is depicted as changing the color and width of the selected control bar 324. For example, as compared to FIGS. 3A and 3B, the control bar 324 has increased in width and changed color from gray to black. Doing so visually distinguishes the selected control bar 324 from control bar 322 which is not currently active. Additionally, the control bar manager 118 has visually identified a border 330 of the activated form element 310. In some cases, the control bar manager may also highlight the activated form element 310 to show that the form element 310 is currently active. It is to be appreciated that the control bar manager 118 may change the visual appearance of the selected control bar and the activated element in a variety of different ways without departing from the spirit or scope of the described techniques.

Figure 3D:
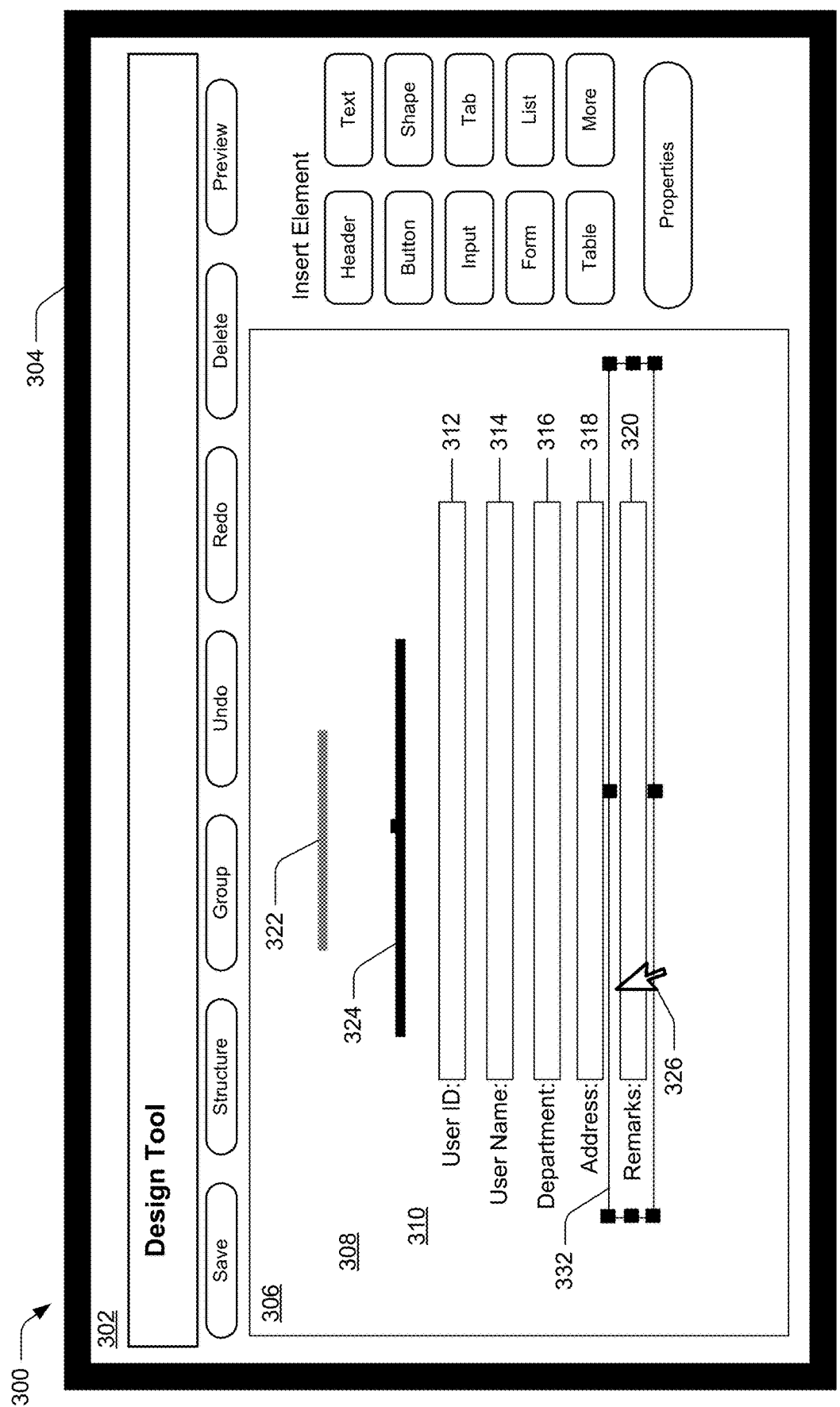
Figure 3E:
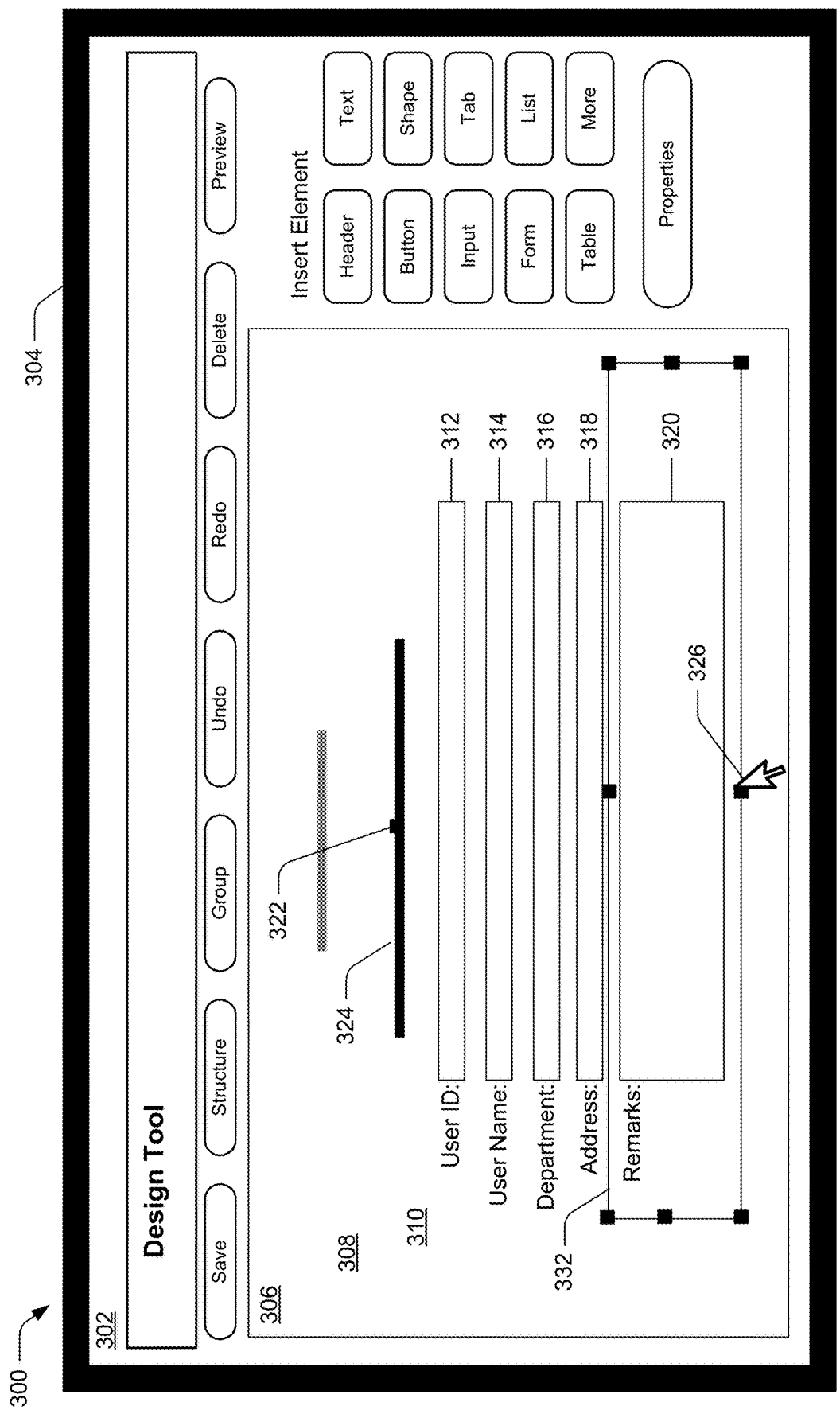

In one or more implementations, the control bar manager 118 is configured to display control bars for container elements, but does not do so for single elements. In example 300, for instance, the data entry field elements 312, 314, 316, 318, and 320 do not include associated control bars because they are each single element which do not contain any child elements. In this implementation, however, single elements which do not include a control bar may be easily selected by the user by first selecting the control bar associated with the container element that contains the single element, and then selecting the single element. In FIG. 3D, for example, after activating form element 310 by selecting control bar 324, the user selects data entry field element 312 by positioning cursor 326 over the data entry field element 312 and initiating a single click or tap. Because form element 310 is currently active, the user can click directly on any of the child elements contained within form element 310 in order to interact with the child elements. Responsive to the user selection of data entry field element 320, the control bar manager has visually identified a border 332 of the activated data entry field element 320. However, it is to be appreciated that the control bar manager may change the visual appearance of the activated element in a variety of different ways without departing from the spirit or scope of the described techniques. The activating enables user interaction with data entry field element 320, such as to move or resize the element, or modify other properties or attributes of the element via a user selection of various controls in the design interface 302. For example, in FIG. 3E the user has modified the size of data entry field element 320 by clicking the border 332 and dragging downwards.

Figure 3F:
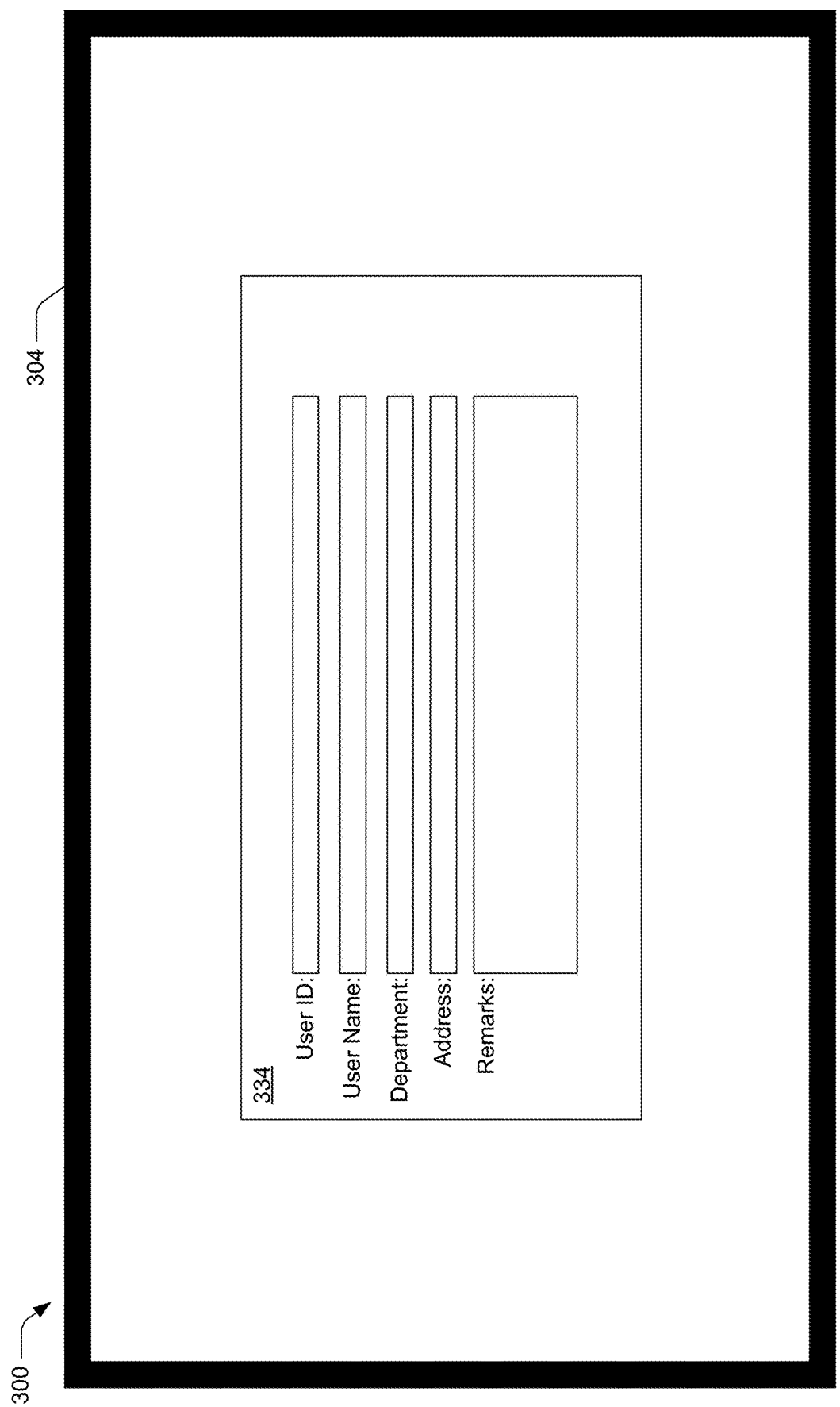

FIG. 3F depicts a finalized version of the digital content 334. As part of generating the finalized version of the digital content 128, the control bar manager 118 automatically removes the control bars from the digital content such that they are no longer visible in the finalized version of the digital content 334. In this example, the design tool 104 has removed the control bars 322 and 324 from the finalized version of the digital content 334.

As discussed throughout, the control bar manager 118 can display the control bar at a preconfigured distance above a top boundary of the element. To do so, the control bar manager 118 can apply a padding layer to each element of the digital content. As an example, consider FIG. 4 which depicts an example 400 that includes an example element 402 and associated control bar 404 that is positioned at a preconfigured distance above a top boundary of the element. In this example, the element 402 is shown with an element height 406 and a top boundary 408, which is depicted as a dashed line. The control bar 404 is displayed at a preconfigured distance above the top boundary 408 of the element 402. In this example, this preconfigured distance is depicted as a padding layer 410. Notably, the distance of the padding layer 410 may be fixed for each element in the digital content. Doing so enables the control bar to have a visible position in the digital content at all times during the design phase. While the padding layer is depicted throughout as being positioned above the top boundary of the element, it is to be appreciated that other configurations could be used without departing from the spirit or scope of the described techniques, such as by positioning the padding layer below the bottom boundary of the element, or to the left or right of the element.

Having considered an example environment, consider now a discussion of some example details of the techniques for a control bar for element activation in accordance with one or more implementations.

Example Procedures

This section describes example procedures for a control bar for element activation. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a design tool, such as design tool 104 that makes use of a control bar manager 118.

Figure 5:
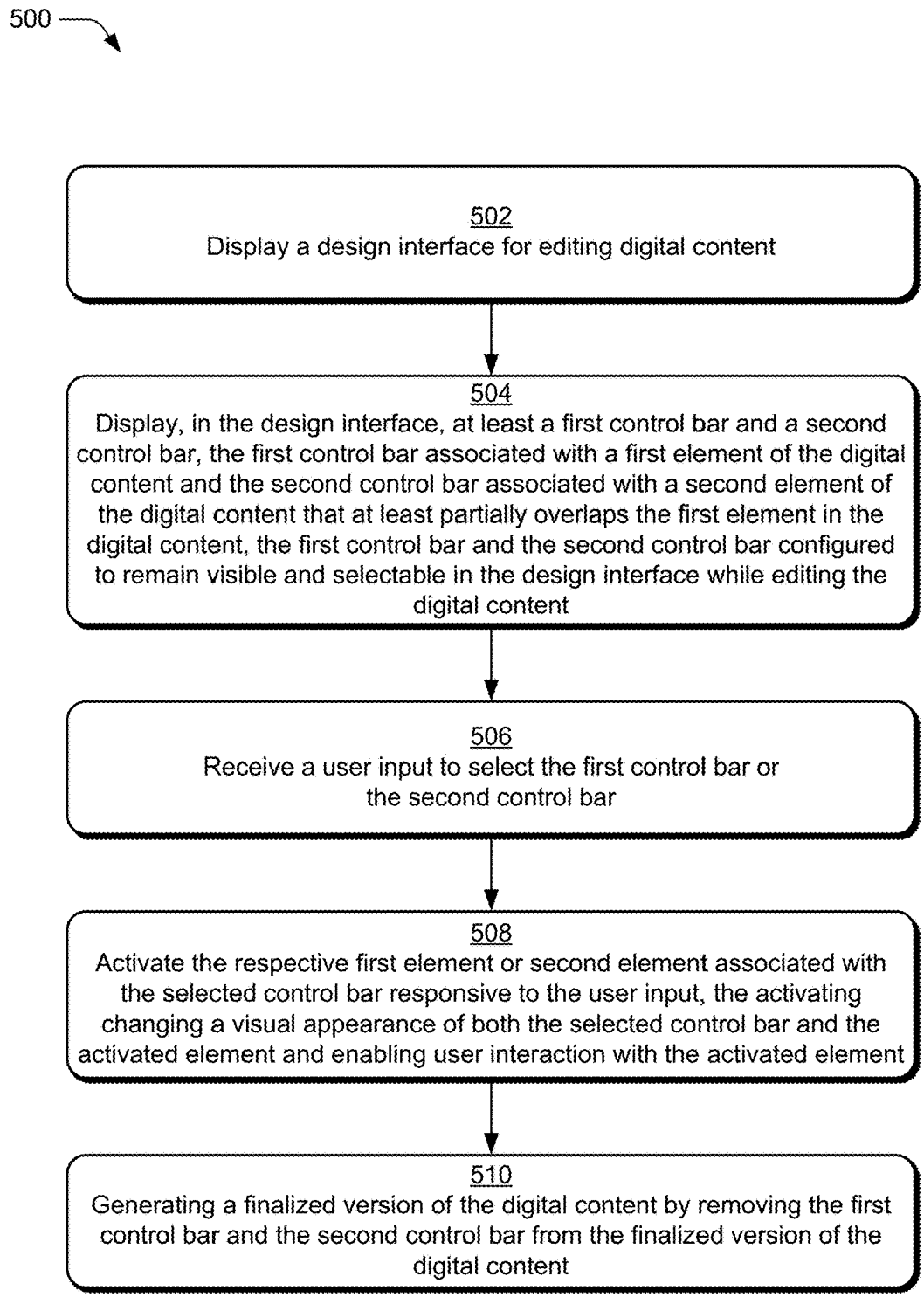
FIG. 5 depicts a procedure in an example implementation in which a control bar manager provides control bars for element activation.

FIG. 5 depicts a procedure 500 in an example implementation in which a control bar manager provides control bars for element activation.

A design interface for editing digital content is displayed (block 502). By way of example, the design tool 104 displays a design interface 110 for editing digital content 106 on a display of computing device 102. The design interface 110 allows users to interact with and edit the elements 108 of the digital content 106 in order to change the properties or attributes of these elements, such as the element's position within the digital content 106, size, shape, color, transparency, fill type (e.g., solid, gradient, pattern, texture, and so on), depth relative to other objects (e.g., in front of or behind), whether the elements cast shadows, and so forth. The design tool 104 may facilitate other content editing operations via the functionality of the design interface 110 without departing from the spirit or scope of the techniques described herein.

A first control bar and a second control bar are displayed in the design interface (block 504). In accordance with the principles discussed herein, the first control bar is associated with a first element of the digital content and the second control bar is associated with a second element of the digital content that at least partially overlaps the first element in the digital content. As discussed throughout, the first control bar and the second control bar are configured to remain visible and selectable in the design interface while editing the digital content. By way of example, the control bar manager 118 displays control bars 122, 124, and 126 for elements 112, 114, and 116, respectively. Each of control bars 122, 124, and 126 are selectable by the user in order to activate the corresponding element 112, 114, or 116. Notably, the control bar manager 118 controls the control bars 120 to remain visible and selectable in the design interface 110 while editing the digital content 106 during the design phase.

User input is received to select the first control bar or the second control bar (block 506). By way of example, the activation module 204 of the control bar manager 118 receives a first user input 208 to select one of the displayed control bars 120. Due to the control bar being always visible and selectable, the user input can be received as a single click or tap on the control bar 120 regardless of the positioning of the control bar relative to other elements of the digital content. In other words, the control bar remains in a top layer of the digital content at all times during the editing phase such that any input to the digital content at a position associated with the control bar causes the activation module to interpret the input as a user selection of the control bar, even in cases in which multiple elements overlap.

The respective first element or second element associated with the selected control bar is activated responsive to the user input (block 508). In accordance with the principles discussed herein, the activating changes a visual appearance of both the selected control bar and the activated element and enables user interaction with the activated element. By way of example, responsive to detecting the first user input 208 to select a control bar 120, the activation module 204 activates the element associated with the selected control bar, which is depicted as activated element 210 in example 200. Additionally, the display module 202 changes a visual appearance of both the selected control bar and the activated element 210. The display module can change the visual appearance of the selected control bar and the activated element 210 in a variety of different ways, including by way of example and not limitation, visually identifying a boundary of the activated element 210, modifying a color of the selected control bar and/or the activated element 210, or changing a size of the selected control bar. Once activated, the operation manager 206 interprets subsequent user input as input to perform an operation with respect to the activated element 210. In this way, the user can quickly click or tap a control bar to activate the associated element, and then provide a second input to interact with or edit the activated element 210, such as by dragging the activated element to a new position within the digital content, changing a size, shape, or color of the activated element 210, or modifying other parameters or attributes of the activated element 210.

A finalized version of the digital content is generated by removing the first control bar and the second control bar from the finalized version of the digital content (block 510). By way of example, at the completion of the design phase, the design tool 104 generates a finalized version of the digital content 128. The finalized version of the digital content 128, for example, can correspond to an image file, movie, document, web page, and so forth. As part of generating the finalized version of the digital content 128, the control bar manager 118 automatically removes the control bars 120 from the digital content 106 such that they are no longer visible in the finalized version of the digital content 128. For example, as depicted in environment 100, the design tool 104 has removed the control bars 122, 124, and 126 from the finalized version of the digital content 128.

Example System and Device

Figure 6:
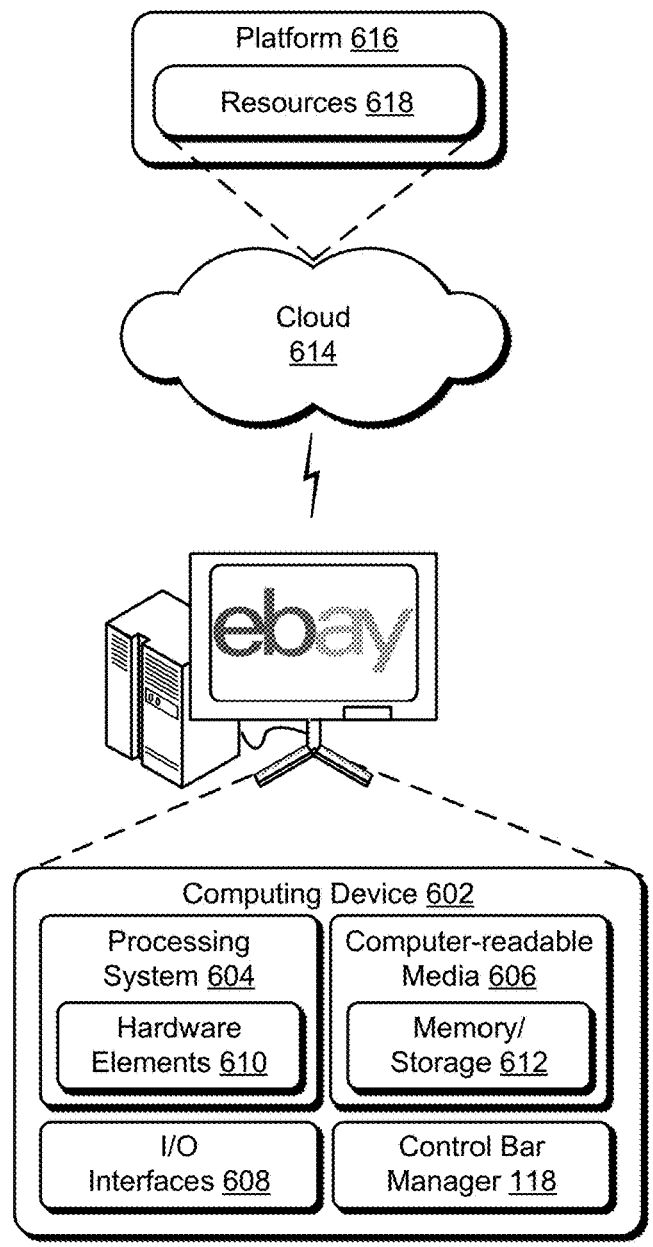
FIG. 6 illustrates an example system that includes an example computing device that is representative of one or more computing systems and/or devices that may implement the various techniques described herein.

FIG. 6 illustrates an example system 600 that includes an example computing device 602 that is representative of one or more computing systems and/or devices that may implement the various techniques described herein. This is illustrated through inclusion of the control bar manager 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method implemented by a computing device, the method comprising:
   beginning an editing phase for editing digital content that includes multiple elements, responsive to beginning the editing phase displaying the multiple elements of the digital content within a design interface and displaying multiple control bars in the design interface, each of the multiple control bars associated with a respective one of the multiple elements of the digital content, wherein each of the multiple control bars are selectable to activate a respective one of the multiple elements;
   controlling each of the multiple control bars to remain visibly displayed in a top layer of the digital content over each of the multiple elements at all times during the editing phase;
   detecting user input to select a control bar of the multiple control bars displayed in the design interface; and
   activating an element associated with the selected control bar responsive to detecting the user input.

2. The method of claim 1, wherein the activated element at least partially overlays at least an additional element of the multiple elements prior to detecting the user input.

3. The method of claim 1, further comprising:
   receiving additional user input to perform an operation with respect to the activated element; and
   performing the operation for the activated element.

4. The method of claim 3, wherein the additional user input comprises dragging input to drag the activated element, and wherein the performing the operation comprises positioning the activated element at a new position within the digital content based on the dragging input.

5. The method of claim 1, wherein the activating comprises changing a visual appearance of both the selected control bar and the activated element.

6. The method of claim 5, wherein the changing the visual appearance includes visually identifying a boundary of the activated element.

7. The method of claim 5, wherein the changing the visual appearance includes modifying a color of the selected control bar and the activated element.

8. The method of claim 5, wherein the changing the visual appearance includes changing a size of the selected control bar.

9. The method of claim 1, wherein the user input comprises a single tap or click on the control bar.

10. The method of claim 1, wherein each of the multiple controls bars are visibly displayed in the design interface during the editing phase, and wherein the method further comprises at a completion of the editing phase, generating a finalized version of the digital content by removing the multiple control bars from the finalized version of the digital content.

11. The method of claim 1, wherein the controlling comprises controlling each of the multiple control bars to remain displayed at a preconfigured distance from a top boundary of the associated element of the multiple elements during the editing phase.

12. The method of claim 11, wherein the control bars comprise horizontal control bars.

13. The method of claim 11, wherein each of the multiple elements includes a non-visible padding layer positioned between a visible portion of the respective element and the associated control bar.

14. The method of claim 13, wherein a thickness of the non-visible padding layer corresponds to the preconfigured distance.

15. One or more computer-readable storage media comprising instructions stored thereon that, responsive to execution by one or more processors, perform operations comprising:

beginning an editing phase for editing digital content that includes multiple elements, responsive to beginning the editing phase displaying the multiple elements of the digital content within a design interface and displaying multiple control bars in the design interface, each of the multiple control bars associated with a respective one of the multiple elements of the digital content, wherein each of the multiple control bars are selectable to activate a respective one of the multiple elements;

controlling each of the multiple control bars to remain visibly displayed in a top layer of the digital content over each of the multiple elements at all times during the editing phase;

detecting user input to select a control bar of the multiple control bars displayed in the design interface; and activating an element associated with the selected control bar respective responsive to detecting the user input.

16. The one or more computer-readable storage media of claim 15, wherein the activated element at least partially overlays at least an additional element of the multiple elements prior to detecting the user input.

17. The one or more computer-readable storage media of claim 15, wherein the user input comprises a single tap or click on the control bar.

18. The one or more computer-readable storage media of claim 15, wherein the operations further comprises at a completion of the editing phase, generating a finalized version of the digital content by removing the multiple control bars from the finalized version of the digital content.

19. The one or more computer-readable storage media of claim 15, wherein the controlling further comprises controlling each of the multiple control bars to remain displayed at a preconfigured distance from a top boundary of the associated element of the multiple elements during the editing phase.

20. A system comprising:

at least a memory and a processor to perform operations comprising:

beginning an editing phase for editing digital content that includes multiple elements, responsive to beginning the editing phase displaying the multiple elements of the digital content within a design interface and displaying multiple control bars in the design interface, each of the multiple control bars associated with a respective one of the multiple elements of the digital content, wherein each of the multiple control bars are selectable to activate a respective one of the multiple elements;

controlling each of the multiple control bars to remain visibly displayed in a top layer of the digital content over each of the multiple elements at all times during the editing phase;

detecting user input to select a control bar of the multiple control bars displayed in the design interface; and activating an element associated with the selected control bar responsive to detecting the user input.

* * * * *